(12) United States Patent
Mizukami et al.

(10) Patent No.: US 10,892,699 B2
(45) Date of Patent: Jan. 12, 2021

(54) INVERSE-MOVEMENT-TYPE VOICE COIL ACTUATING APPARATUS

(71) Applicant: VIEWPOINT ELECTRONICS CO., LTD., Taipei (TW)

(72) Inventors: Masafumi Mizukami, Tokyo (JP); Chih-Chien Hsu, Taipei (TW); Yu-Chung Lee, Taipei (TW)

(73) Assignee: VIEWPOINT ELECTRONICS CO., LTD., Taipei (TW)

(*) Notice: Subject to any disclaimer, the term of this patent is extended or adjusted under 35 U.S.C. 154(b) by 289 days.

(21) Appl. No.: 15/782,828

(22) Filed: Oct. 12, 2017

(65) Prior Publication Data

US 2019/0115860 A1    Apr. 18, 2019

(51) Int. Cl.
| | |
|---|---|
| *G02B 7/02* | (2006.01) |
| *H02P 25/034* | (2016.01) |
| *H02K 41/035* | (2006.01) |
| *G03B 13/36* | (2006.01) |
| *G02B 7/09* | (2006.01) |

(52) U.S. Cl.
CPC .............. *H02P 25/034* (2016.02); *G02B 7/09* (2013.01); *G03B 13/36* (2013.01); *H02K 41/0356* (2013.01); *G02B 7/022* (2013.01); *G03B 2205/0069* (2013.01)

(58) Field of Classification Search
CPC .......... G02B 7/023; G02B 7/102; G02B 7/08; G02B 7/021; G02B 7/02; G02B 7/026; G02B 7/14; G02B 7/646; G03B 5/00; G03B 2205/0092; G03B 2205/0015; G03B 2205/0046; G03B 2205/0069; G03B 17/12; G03B 17/002; G03F 7/70825; G03F 7/70258; G03F 7/7015; G03F 7/70191; G03F 7/70266; G03F 7/70833
USPC ......................................................... 359/813
See application file for complete search history.

(56) References Cited

U.S. PATENT DOCUMENTS

| | | | |
|---|---|---|---|
| 6,750,625 B2* | 6/2004 | Binnard ............. | G03F 7/70716 318/568.17 |
| 2003/0173833 A1* | 9/2003 | Hazelton ............ | G03F 7/70716 310/12.06 |
| 2007/0047942 A1* | 3/2007 | Chang .................... | G02B 7/08 396/133 |
| 2013/0170055 A1* | 7/2013 | Yu ........................... | G02B 7/08 359/824 |

(Continued)

FOREIGN PATENT DOCUMENTS

CN             104995541 B   * 10/2018   ............... G02B 7/08

*Primary Examiner* — William R Alexander
*Assistant Examiner* — Tamara Y. Washington
(74) *Attorney, Agent, or Firm* — Chun-Ming Shih; HDLS IPR Services (57) ABSTRACT

An inverse-movement-type voice coil actuating apparatus includes a case structure, a stationary lens module, and a movable image sensing and focusing assembly. The case structure has a case. The lens module is assembled in the case to define an optical axis. The image sensing and focusing assembly is received in the case and moves back and forth along the optical axis with respect to the lens module to focus. Thus, the path of the back-and-forth movement of the image sensing and focusing assembly can be ensured to remain consistent with the optical axis and the lens can be pre-screwed without dropping the dust during the assembly process to further increase the production yield.

19 Claims, 8 Drawing Sheets

(56) References Cited

U.S. PATENT DOCUMENTS

2017/0235095 A1* 8/2017 Sekimoto ............. H04N 5/2254
                                                    359/824
2020/0233123 A1* 7/2020 Wheatley ............... G02B 5/208

* cited by examiner

INVERSE-MOVEMENT-TYPE VOICE COIL ACTUATING APPARATUS

BACKGROUND OF THE INVENTION

Field of the Invention

The present invention relates to a voice coil actuating apparatus and in particular to an inverse-movement-type voice coil actuating apparatus with a stationary lens module.

Description of Prior Art

Nowadays, there are more and more electronic devices equipped with autofocus cameras. In order to meet the requirements of the electronic devices made increasingly thin, the voice coil motor (VCM) is usually used to control the autofocus function.

The existing VCM adjusts the focus by controlling the movement of the lens module and uses an upper reed and a lower reed to assist and guide the lens module to move back and forth along the optical axis (or uses the weight of the lens or the switching of electric current to control the back-and-forth movement). As for the image sensor, it remains stationary.

However, the existing voice coil motor using the movement of the lens module to adjust the focus suffers the following disadvantages which need to be overcome.

First, the reeds are easily deformed. When the lens unit is screwed on the lens fixture, an excessive torsion force occurs due to the friction caused between the lens unit and the lens fixture during the screwing process. Thus, when this torsion force is greater than the maximal torsion force of the reed (the diameter of the connection line of the reed is usually smaller than that of the human hair), the reed will deform. Once the reed used for guidance deforms, the path of the back-and-forth movement of the lens module cannot remain on the original optical axis, which causes inaccurate image sensing and distorted images.

Second, the dust is easy to drop to generate black spots. When the lens unit is screwed on the lens fixture, the dust is generated due to the friction between the lens unit and the lens fixture. The dropped dust will affect the image sensing and cause the black spots on the images.

Therefore, how to design a novel voice coil actuating apparatus to overcome the above disadvantages becomes the improvement target of the inventor.

SUMMARY OF THE INVENTION

The objective of the present invention is to provide an inverse-movement-type voice coil actuating apparatus which eliminates the issue of the reed deformation with an inverse-movement design using a stationary lens module and a movable image sensing and focusing assembly. As a result, the path of the back-and-forth movement of the image sensing and focusing assembly can be ensured to remain consistent with the optical axis and the issue of the dropped dust can be resolved. Thus, the production yield is increased.

To achieve the above objective, the present invention provides an inverse-movement-type voice coil actuating apparatus, which comprises a case structure, a lens module, and an image sensing and focusing assembly. The case structure has a case. The lens module is stationary and is assembled in the case to define an optical axis. The image sensing and focusing assembly, which is movable and received in the case, moves back and forth along the optical axis with respect to the lens module to focus.

Compared with the prior art, the present invention has the following effects. The path of the back-and-forth movement of the image sensing and focusing assembly can be ensured to remain consistent with the optical axis. The lens can be pre-screwed without dropping the dust during the assembly process. Thus, the production yield is increased.

DETAILED DESCRIPTION OF THE INVENTION

The technical features and details of the present invention are described below in reference to accompanying figures. However, the accompanying figures are only for reference and explanation, but not to limit the scope of the present invention.

Figure 1:
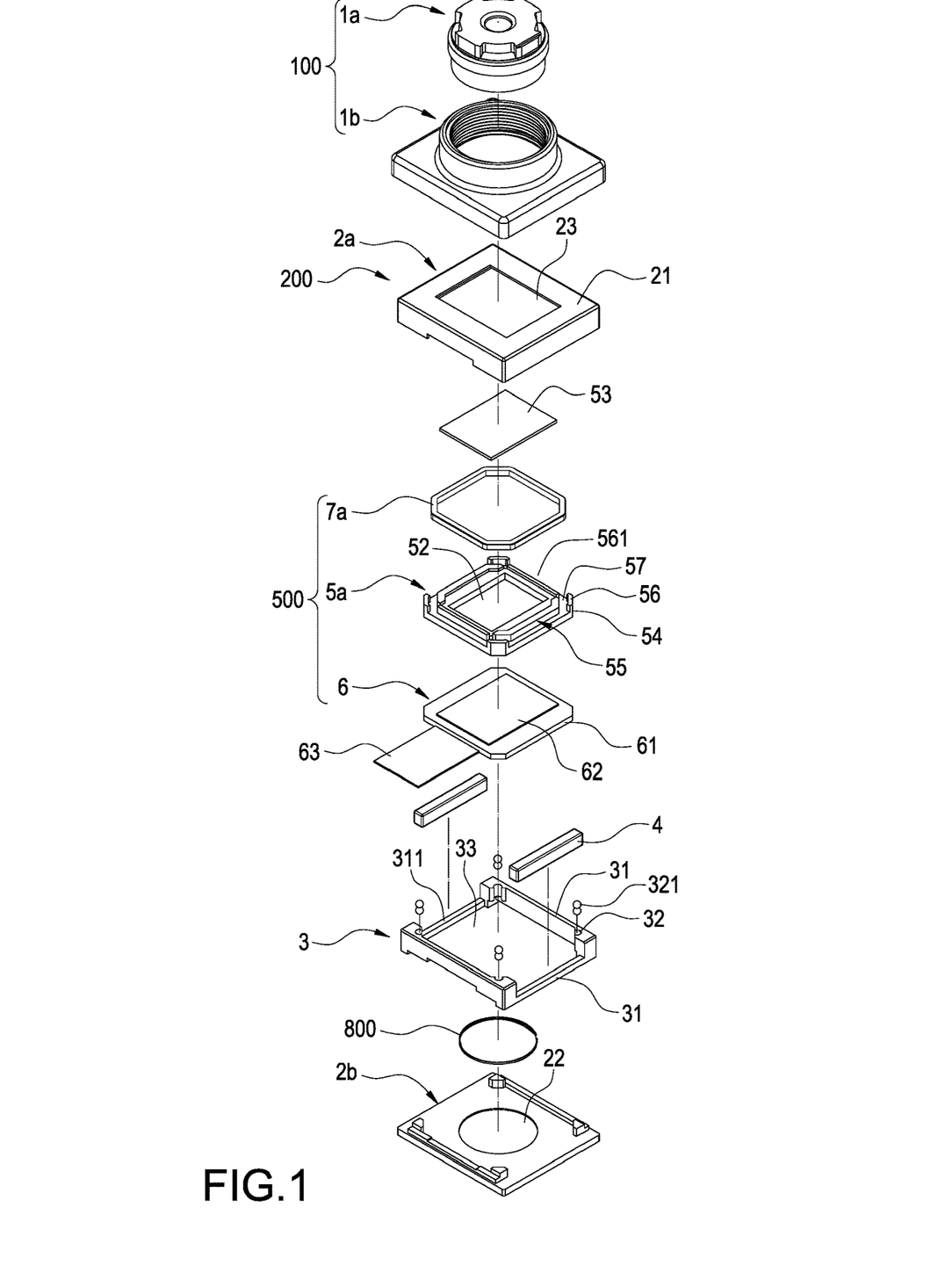
FIG. 1 is a detailed perspective exploded view of the inverse-movement-type voice coil actuating apparatus according to the first embodiment of the present invention.
Figure 2:
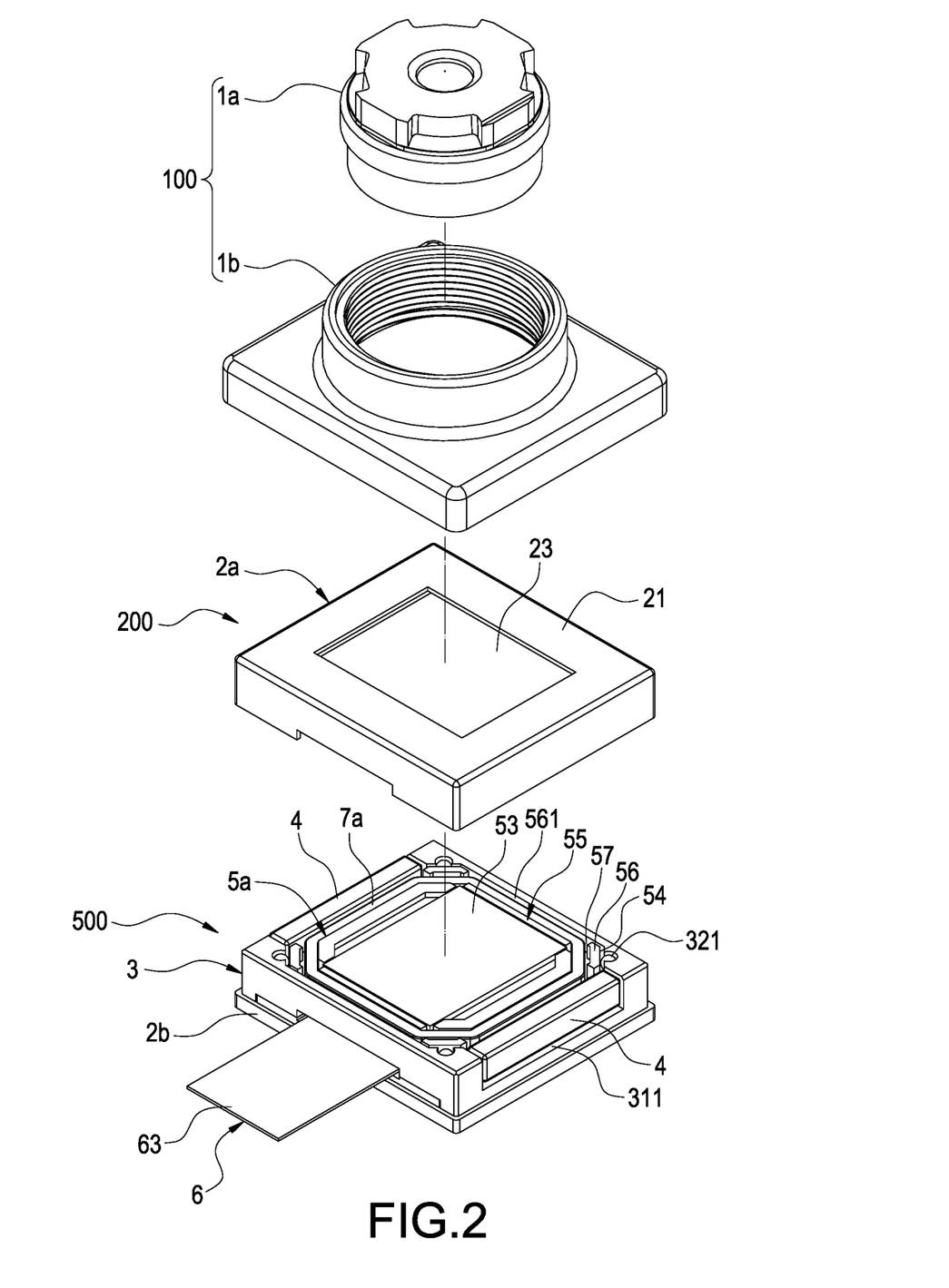
FIG. 2 is a partial perspective exploded view of FIG. 1 being partially assembled.
Figure 3:
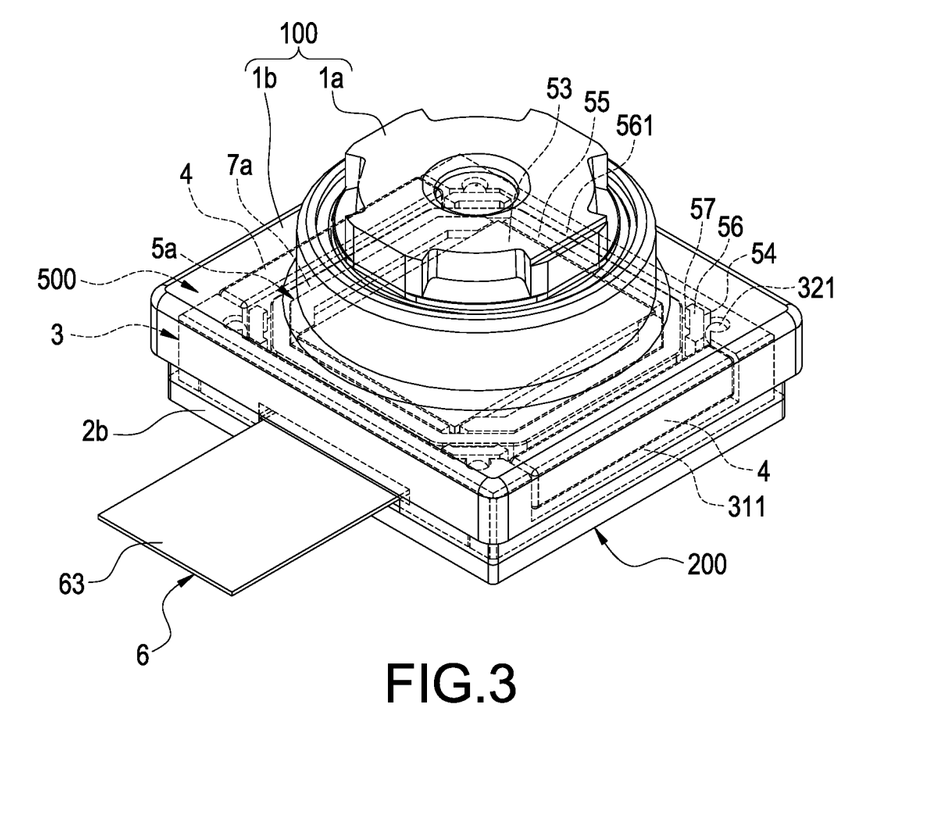
FIG. 3 is a perspective assembled view of the inverse-movement-type voice coil actuating apparatus according to the first embodiment of the present invention.
Figure 4:
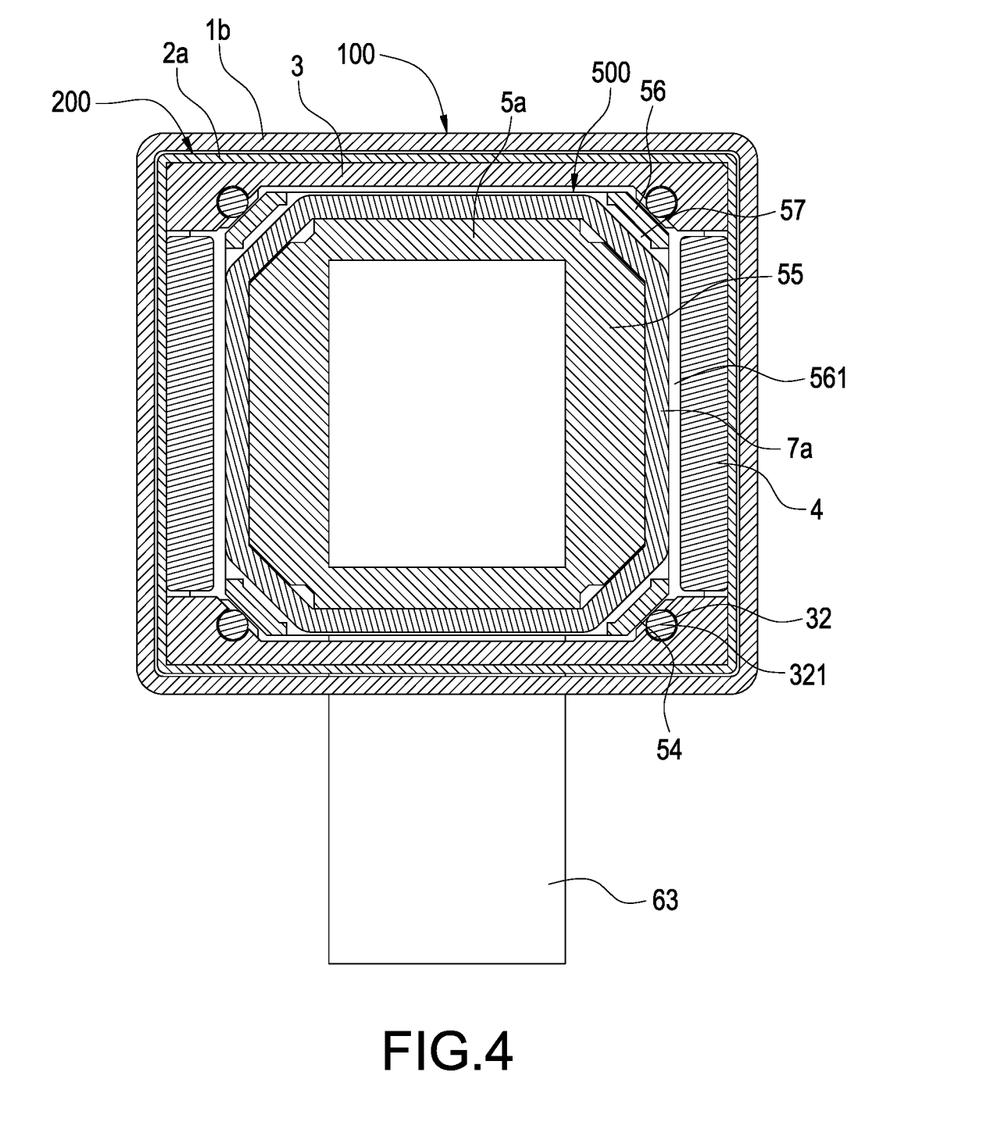
FIG. 4 is a top cross-sectional view of the inverse-movement-type voice coil actuating apparatus according to the first embodiment of the present invention.
Figure 6:
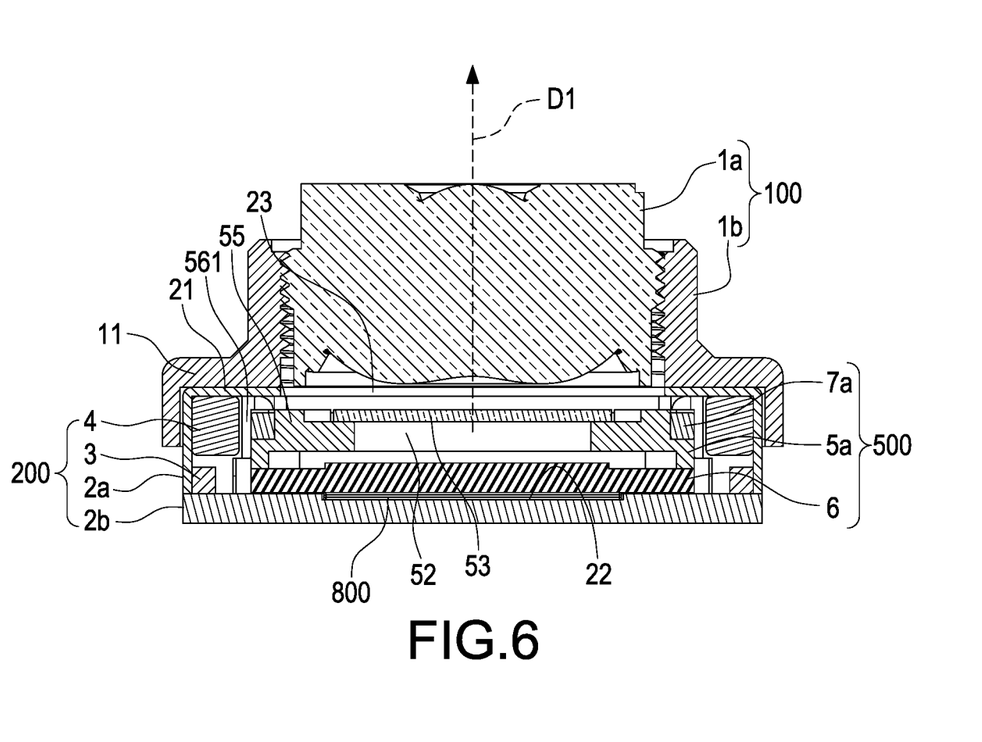
FIG. 6 is a latitudinal cross-sectional view of the inverse-movement-type voice coil actuating apparatus according to the first embodiment of the present invention after movement.
Figure 7:
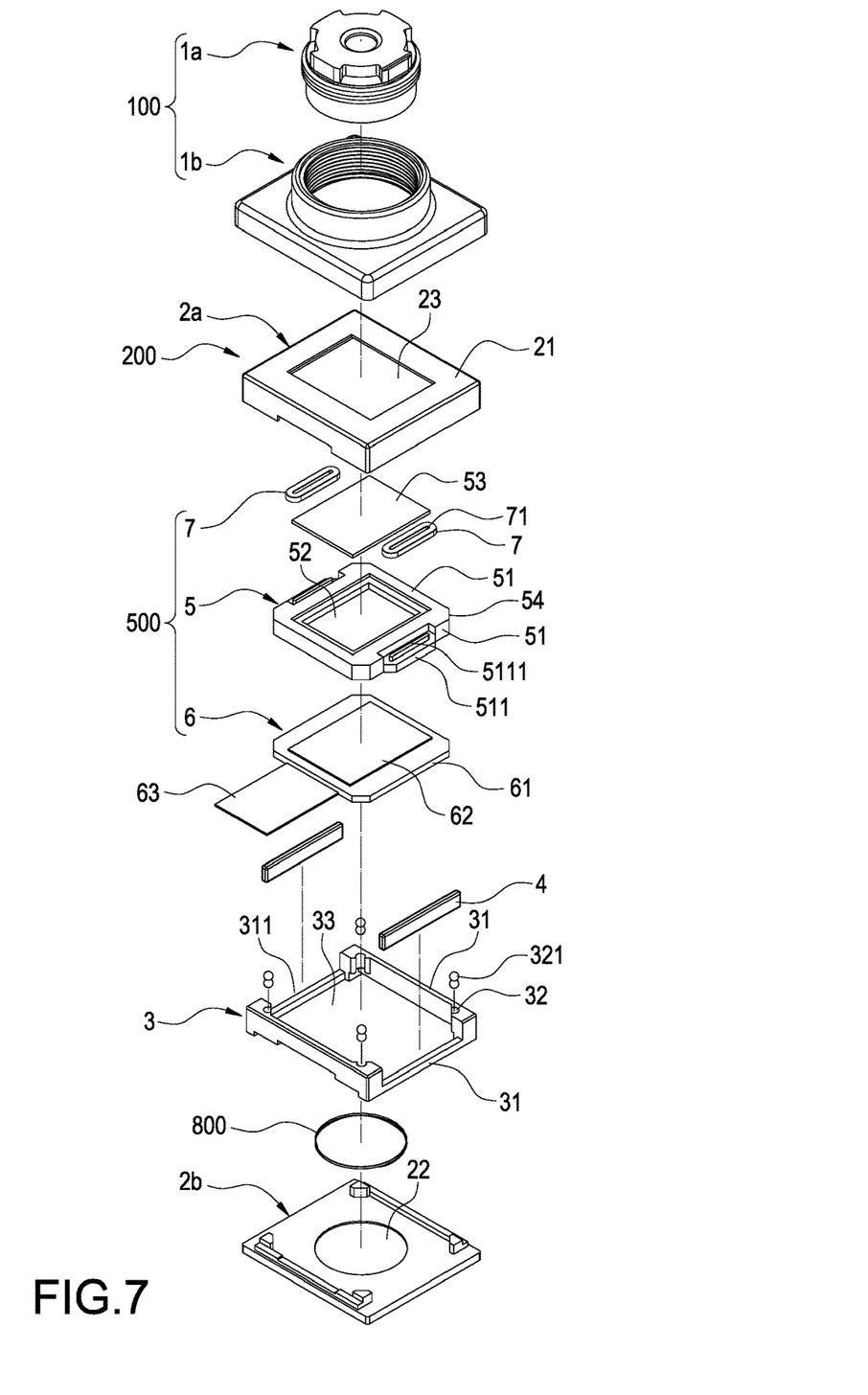
FIG. 7 is a detailed perspective exploded view of the inverse-movement-type voice coil actuating apparatus according to the second embodiment of the present invention.
Figure 8:
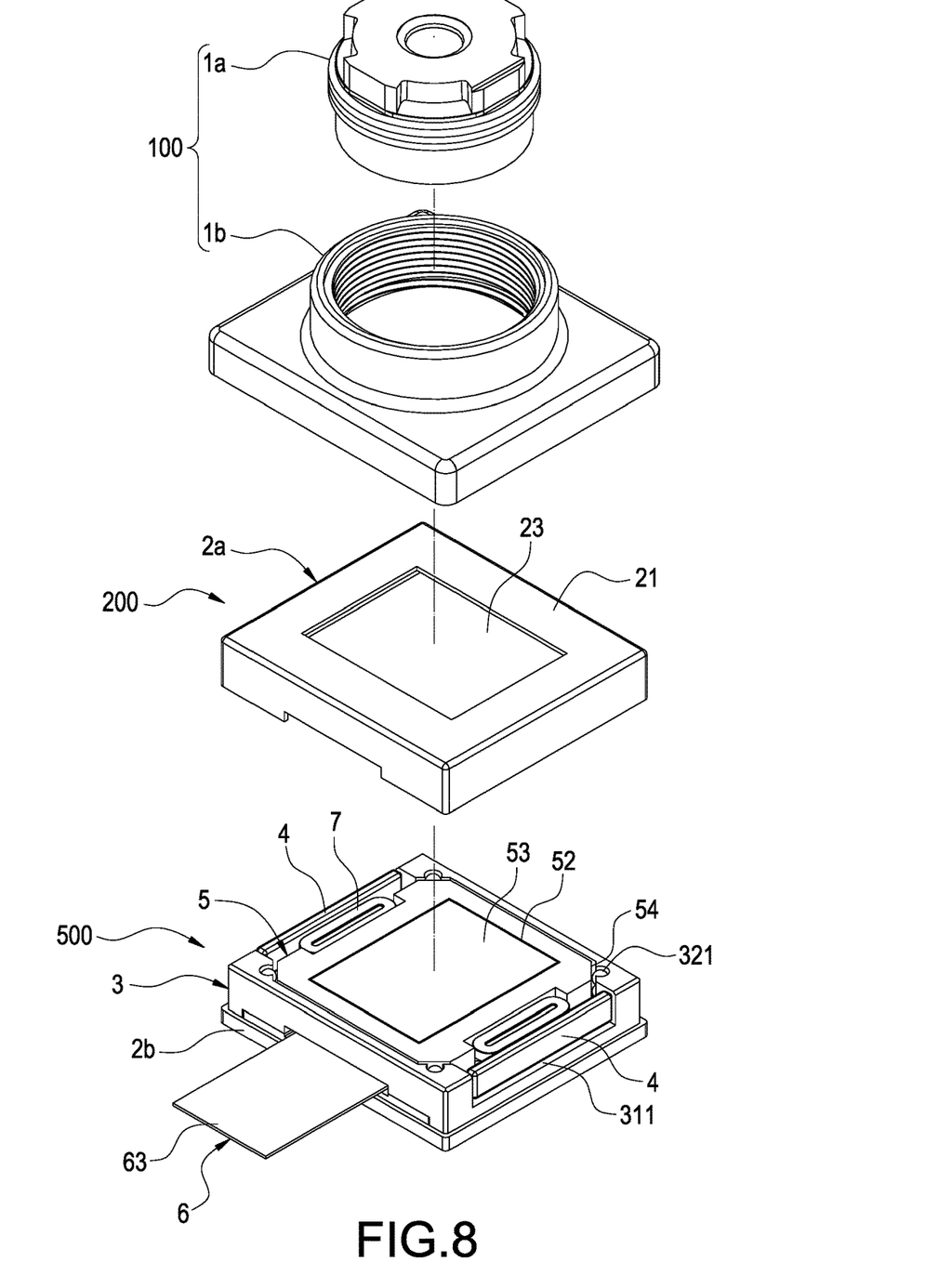
FIG. 8 is a partial perspective exploded view of FIG. 7 being partially assembled.
Figure 9:
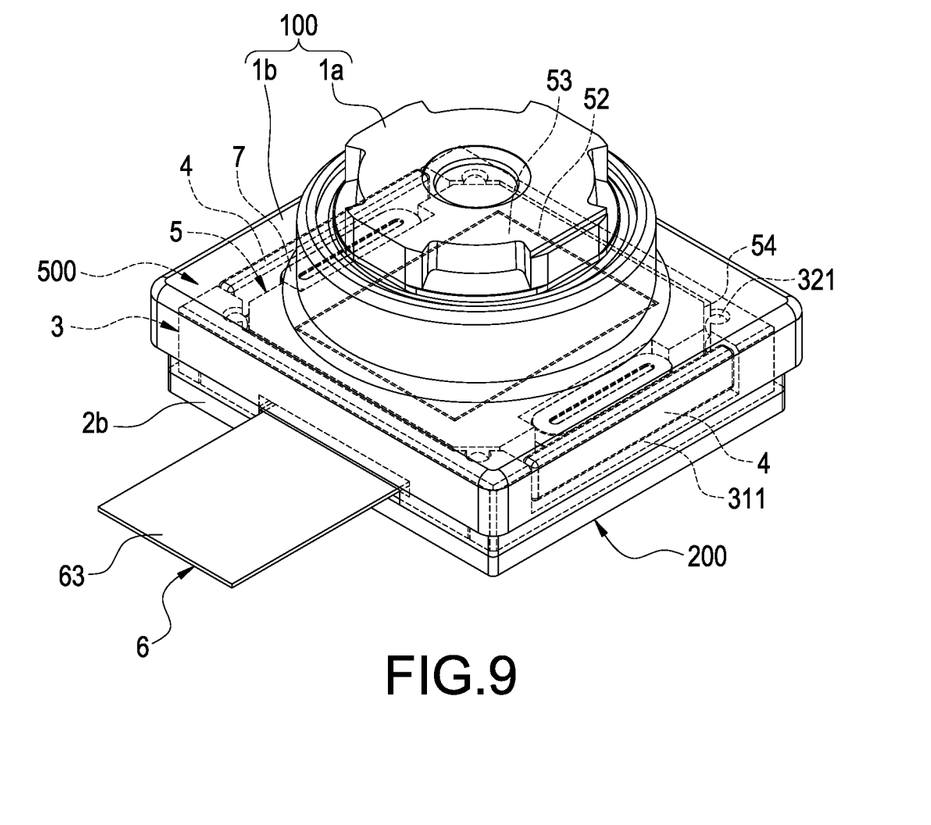
FIG. 9 is a perspective assembled view of the inverse-movement-type voice coil actuating apparatus according to the second embodiment of the present invention.

The present invention provides an inverse-movement-type voice coil actuating apparatus, as shown in FIG. 1 or FIG. 7. The present invention mainly adopts an inverse-movement design in which the lens module 100 is stationary and the image sensing and focusing assembly 500 is movable. The inverse actuating way of the present invention, compared with that of the existing VCM, explains the title of the present invention, an inverse-movement-type voice coil actuating apparatus. FIGS. 1-6 show the first embodiment of the present invention and FIGS. 7-9 show the second embodiment of the present invention.

As shown in FIGS. 1-5, the inverse-movement-type voice coil actuating apparatus according to the first embodiment of the present invention comprises a case structure 200, a lens module 100 which is stationary, and an image sensing and focusing assembly 500 which is movable. Preferably, the inverse-movement-type voice coil actuating apparatus further comprises an elastic part 800.

The case structure 200 mainly has a case. Preferably, the case structure 200 further has a holding base 3 fixed in the case and at least one magnet 4 disposed on the holding base 3. In particular, the case comprises a first shell 2a and a second shell 2b, both of which can be assembled together to form a receiving space. Also, the case is provided with a first assembly portion 21 which is preferably formed on the outside of the first shell 2a.

The holding base 3 can be a first frame and has a plurality of side walls 31 arranged as a loop. The magnet 4 can be singular or plural in number, which is not restricted in the present invention. In the current embodiment, the magnet 4 is plural in number for explanation. When there is only one magnet 4 (not shown), it is disposed to surround all the side walls 31 on the first frame. When there are plural magnets 4 (e.g., the number is two, four, or above four), they are disposed on the corresponding side walls 31 and are exposed inwards. In particular, each of all or some of the side walls 31 individually has a cutting 311; the magnets 4 are individually disposed at the corresponding cuttings 311 such that the magnets 4 are individually exposed inwards through the cuttings 311. Besides, the holding base 3 is fixed on the inner side of the second shell 2b.

Figure 5:
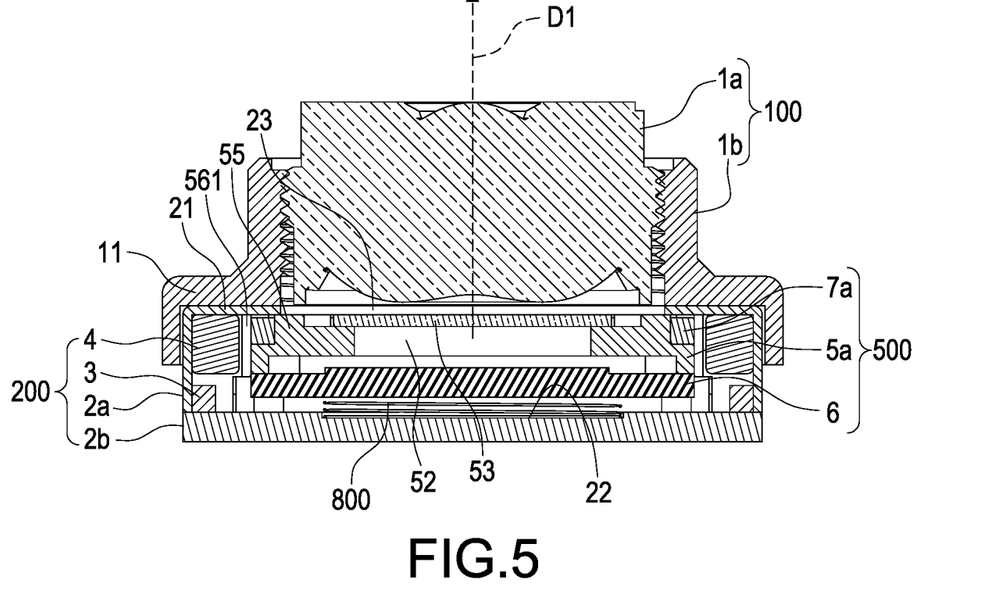
FIG. 5 is a latitudinal cross-sectional view of the inverse-movement-type voice coil actuating apparatus according to the first embodiment of the present invention before movement.

The lens module 100 is assembled in the case to define an optical axis D1 (see FIG. 5). In particular, the lens module 100 comprises a lens 1a and a lens fixture 1b. The lens 1a has an external thread. The lens fixture 1b is provided with a screw hole (not labeled) in which a corresponding internal thread is disposed such that the lens 1a can be screwed, using its external thread and along the optical axis D1, to the internal thread of the lens fixture 1b.

The lens fixture 1b is further provided with a second assembly portion 11 (see FIG. 5) corresponding to the first assembly portion 21 such that the lens fixture 1b can be assembled to the first assembly portion 21 of the first shell 2a with the second assembly portion 11 to fix each other.

The image sensing and focusing assembly 500 is movable and is received in the case such that the image sensing and focusing assembly 500 can move back and forth along the optical axis D1 with respect to the lens module 100 to focus. Preferably, the image sensing and focusing assembly 500 has a moving frame 5a, an image sensing module 6, and at least one coil 7a to sense the images and adjust the focus by moving back and forth.

The moving frame 5a can be a second frame. One side of the second frame is provided with a protruding inner wall 55 and a plurality of outer walls 56 spaced from and surrounding the protruding inner wall 55. The coil 7a is singular or plural in number, which is not restricted in the present invention. In the current embodiment, the coil 7a is singular in number for explanation. In particular, the moving frame 5a has a third opening 52 which the protruding inner wall 55 surrounds. Besides, a positioning groove 57 is formed between the protruding inner wall 55 and the outer walls 56. The single coil 7a with a corresponding shape is disposed in the positioning groove 57 to be positioned. A gap 561 is formed between any two adjacent outer walls 56 such that the coil 7a is exposed outwards through each of the gaps 561. Further, in the variant embodiment not shown in the figures, each of the magnets 4 can be disposed on the moving frame 5a and the coil 7a can be disposed on the holding base 3, which is not restricted in the present invention.

The moving frame 5a (i.e. the second frame) is disposed movably in the holding base 3 (i.e., the first frame). The coil 7a of the moving frame 5a and the magnets 4 of the holding base 3 are next to each other (see FIG. 5) and communicate with each other through the gaps 561. In this way, the moving frame 5a can move back and forth along the optical axis D1 with respect to the lens module 100 through the interaction between the coil 7 and the magnets 4 to focus.

The image sensing module 6 is disposed on and moves with the moving frame 5a. Specifically, the image sensing module 6 comprises a primary circuit board 61 stacked on and fixed on the bottom side of the moving frame 5a, a sensing part 62 electrically disposed on one side of the primary circuit board 61, and a flexible circuit board 63 electrically connected to the primary circuit board 61. The sensing part 62 overlaps the third opening 52 correspondingly.

In addition, a filter 53 is disposed and positioned in the protruding inner wall 55 of the moving frame 5a such that the filter 53 covers the third opening 52 correspondingly and overlaps the sensing part 62 correspondingly.

Besides, the first shell 2a and the holding base 3 are provided with a first opening 23 and a second opening 33, respectively. The thread hole of the lens fixture 1b, the first opening 23 of the first shell 2a, the third opening 52 of the moving frame 5a, and the second opening 33 of the holding base 3 are lined up along the optical axis D1 and disposed between the lens 1a and the sensing part 62.

As shown in FIGS. 5 and 6, the inverse-movement-type voice coil actuating apparatus of the present invention is constructed by the above structures. When the magnets 4 are actuated by the coil 7a through the flexible circuit board 63, the moving frame 5a can be controlled to move along the optical axis D1 away from the lens 1a (see FIG. 6) and to reverse towards the lens 1a (see FIG. 5). As such, the inverse type of the back-and-forth movement of the image sensing and focusing assembly 500 with respect to the lens module 100 can be used to meet the focus requirements and to overcome the disadvantages of the existing technology.

In other words, the present invention can use the interaction between the magnets 4 and the coil 7a to directly control the movement in two opposite directions (not shown). Preferably, as shown in FIGS. 1-6, an elastic part 800 is disposed between the primary circuit board 61 of the image sensing module 6 and the second shell 2b of the above-mentioned case. In the returning direction of approaching the lens 1a, the elastic part 800 is used to bounce the image sensing module 6 back to the initial position; in the forward direction of leaving the lens 1a, the interaction between the magnets 4 and the coil 7a is used for control.

The elastic part 800 can be a compressed spring or any elastic body/object with a similar function. A positioning portion 22 is disposed on the inner side of the second shell 2b. One end of the elastic part 800 is positioned in the positioning portion 22 correspondingly and the other end of the elastic part 800 is pressed against the other side of the primary circuit board 61.

Moreover, a guiding structure can be further disposed between the holding base 3 and the moving frame 5a to guide the moving frame 5a to linearly move along the optical axis D1 more precisely and effectively. The guiding structure comprises the balls 321 and the sliding contact portions 54. A plurality of corners (not labeled) is disposed on the inner perimeter of the holding base 3. Each of the corners has a ball well 32 along the optical axis D1. Each ball well 32 communicates with the inside of the holding base 3 and receives at least one ball 321 such that each ball 321 is partially protruded from the break of the ball well 32 (see FIG. 4). A plurality of sliding contact portions 54 are disposed on the outer perimeter of the moving frame 5a corresponding to the ball wells 32. Each of the sliding contact portions 54 slides in contact with the balls 321 in the ball wells 32 to be guided linearly (see FIG. 4).

As shown in FIGS. 7-9, the inverse-movement-type voice coil actuating apparatus according to the second embodiment of the present invention is roughly similar to the first embodiment mentioned previously. The difference is that the coil 7 of the image sensing and focusing assembly 500 is plural in number and the structure of the moving frame 5 is modified correspondingly in the second embodiment. The details are described below.

The moving frame 5 has a plurality of side walls 51 arranged as a loop. The plural coils 7, which are two, four, or above four in number, are disposed on the corresponding sides walls 51 and exposed outwards. In particular, each of all or some of the side walls 51 protrudes individually to form a side wing 511; each of the coils 7 is disposed on the corresponding side wings 511. Also, each of the side wings 511 preferably protrudes to from a rib 5111. Each of the coils 7 further has a slot 71 which is sleeved around the corresponding rib 5111 of the side wing 511 such that the coil 7 can be positioned (i.e., the ribs 5111 are individually inserted into the slots 71). Each of the coils 7 of the moving frame 5 corresponds to the respective magnets 4 of the holding base 3. The coils 7 and the magnets 4 are next to each other. Thus, the moving frame 5 can move back and forth along the optical axis D1 (refer to FIG. 5) with respect to the lens module 100 through the interaction between the coils 7 and the magnets 4 to focus. Moreover, the moving frame 5 as the above-mentioned second frame with the third opening 52 can position the filter 53 corresponding to the third opening 52 such that the filter 53 overlaps the sensing part 62 correspondingly. Besides, the moving frame 5 has the above-mentioned sliding contact portions 54.

In summary, compared with the prior art, the present invention has the following effects. By means of an inverse-movement design using a stationary lens module 100 and a movable image sensing and focusing assembly 500, the production yield can be increased. First, the reeds are eliminated and there is no more issue about reed deformation. Thus, the path of the back-and-forth movement of the image sensing and focusing assembly 500 remains consistent with the original optical axis D1. Second, the assembly of the lens module 100 and the image sensing and focusing assembly 500 are separately performed. Therefore, even though the dust is generated when the lens 1a is screwed to the lens fixture 1b, the dust will not drop upon the image sensing and focusing assembly 500. That is, there are not black spots generated during the image sensing process. As for the assembly process, only the second assembly portion 11 of the assembled lens module 100 is assembled to the first assembly portion 21 of the case structure 200 and thus the assembly of the inverse-movement-type voice coil actuating apparatus of the present invention can be easily completed.

In addition, the present invention also has other effects. By means of the introduction of the guiding structure, the moving frame 5 (5a) can be guided to linearly move along the optical axis D1 more precisely and effectively, which further ensures that the path of the back-and-forth movement of the image sensing and focusing assembly 500 definitely remains consistent with the optical axis D1.

The embodiments described above are only preferred ones of the present invention and are not to limit the scope of the present invention. All the equivalent modifications and variations applying the specification and figures of the present invention should be embraced by the claimed scope of the present invention.

What is claimed is:

1. An inverse-movement-type voice coil actuating apparatus, comprising:
   a case assembly having a support structure;
   an immovable lens module which is stationary and assembled in the support structure to define an optical axis; and
   an image sensing and focusing assembly which is movable and received in the support structure, wherein the image sensing and focusing assembly moves back and forth along the optical axis with respect to the lens module to focus,
   wherein the inverse-movement-type voice coil actuating apparatus does not have movable lens.

2. The inverse-movement-type voice coil actuating apparatus according to claim 1, wherein the lens module comprises a lens and a lens fixture, wherein the lens fixture is assembled out of the support structure, wherein the lens is disposed on the lens fixture.

3. The inverse-movement-type voice coil actuating apparatus according to claim 2, wherein the support structure is provided with a first assembly portion, wherein the lens fixtures is provided with a second assembly portion corresponding to the first assembly portion.

4. The inverse-movement-type voice coil actuating apparatus according to claim 1, wherein the image sensing and focusing assembly has a moving frame and an image sensing module, wherein the case assembly further has a holding base fixed in the support structure, wherein the moving frame is disposed movably in the holding base and moves back and forth along the optical axis with respect to the lens module, wherein the image sensing module is disposed on and moves with the moving frame.

5. The inverse-movement-type voice coil actuating apparatus according to claim 4, the case assembly further has at least one magnet, wherein the image sensing and focusing assembly further has at least one coil, wherein the at least one magnet and the at least one coil are disposed on the holding base and the moving frame, respectively, wherein the at least one magnet and the at least one coil are next to each other.

6. The inverse-movement-type voice coil actuating apparatus according to claim 5, wherein the at least one magnet and the at least one coil are both plural in number, wherein the holding base and the moving frame are a first frame and a second frame, respectively, wherein the magnets are disposed on the first frame and exposed inwards, wherein the coils are disposed on the second frame and exposed outwards.

7. The inverse-movement-type voice coil actuating apparatus according to claim 6, wherein the moving frame has a plurality of side walls, wherein all or some of the side walls of the moving frame are individually provided with a side wing, wherein the coils are individually disposed on the corresponding side wings.

8. The inverse-movement-type voice coil actuating apparatus according to claim 7, wherein each of the coils has a slot, wherein each of the side wings has a rib inserted into the corresponding slot to be positioned.

9. The inverse-movement-type voice coil actuating apparatus according to claim 6, wherein the holding base has a plurality of side walls, wherein each of all or some of the side walls of the holding base individually has a cutting, wherein the magnets are individually disposed at the corresponding cuttings.

10. The inverse-movement-type voice coil actuating apparatus according to claim 5, wherein the at least one coil is singular in number and the at least one magnet is plural in number, wherein the holding base and the moving frame are a first frame and a second frame, respectively, wherein the magnets are disposed on the first frame and exposed inwards, wherein the coil is disposed on the second frame and exposed outwards.

11. The inverse-movement-type voice coil actuating apparatus according to claim 10, wherein one side of the second frame is provided with a protruding inner wall and a plurality of outer walls surrounding the protruding inner wall, wherein a positioning groove is formed between the protruding inner wall and the outer walls, wherein the coil is disposed in the positioning groove to be positioned, wherein a gap is formed between any two adjacent outer walls, wherein the coil is exposed outwards through each of the gaps.

12. The inverse-movement-type voice coil actuating apparatus according to claim 10, wherein the holding base has a plurality of side walls, wherein each of all or some of the side walls of the holding base individually has a cutting, wherein the magnets are individually disposed at the corresponding cutting.

13. The inverse-movement-type voice coil actuating apparatus according to claim 4, wherein the moving frame is a frame and is provided with a filter, wherein the image sensing module is stacked on the moving frame and overlaps the filter correspondingly.

14. The inverse-movement-type voice coil actuating apparatus according to claim 4, wherein the holding frame is a frame, wherein a plurality of balls are disposed on the inner perimeter of the frame, wherein the perimeter of the moving frame slides in contact with the balls to be guided.

15. The inverse-movement-type voice coil actuating apparatus according to claim 14, wherein a plurality of corners are disposed on the inner perimeter of the holding base, wherein each of the corners has a ball well along the optical axis, wherein the ball well communicates with the inside of the holding base and receives at least one of the balls.

16. The inverse-movement-type voice coil actuating apparatus according to claim 4, further comprising an elastic part disposed between the image sensing module and the support structure.

17. The inverse-movement-type voice coil actuating apparatus according to claim 16, wherein a positioning portion is disposed on the inner side of the support structure, wherein the elastic part is positioned corresponding to the positioning portion.

18. The inverse-movement-type voice coil actuating apparatus according to claim 1, further comprising an elastic part disposed between the image sensing and focusing assembly and the support structure.

19. The inverse-movement-type voice coil actuating apparatus according to claim 18, wherein a positioning portion is disposed on the inner side of the support structure, wherein the elastic part is positioned corresponding to the positioning portion.

* * * * *